US012799249B2

(12) United States Patent
Tian et al.

(10) Patent No.: US 12,799,249 B2
(45) Date of Patent: Nov. 17, 2026

(54) CURABLE POLYMER COMPOSITION

(71) Applicant: Notark Corporation, Houston, TX (US)

(72) Inventors: Jason Tian, Houston, TX (US); Ruidong Ding, Houston, TX (US); Vijay Mhetar, Houston, TX (US); Chad Reiter, Savannah, GA (US); Donna Rucker, Savannah, GA (US)

(73) Assignee: Notark Corporation, The Woodlands, TX (US)

( * ) Notice: Subject to any disclaimer, the term of this patent is extended or adjusted under 35 U.S.C. 154(b) by 656 days.

(21) Appl. No.: 18/344,988

(22) Filed: Jun. 30, 2023

(65) Prior Publication Data

US 2024/0002563 A1 Jan. 4, 2024

Related U.S. Application Data

(60) Provisional application No. 63/367,531, filed on Jul. 1, 2022.

(51) Int. Cl.
*C08F 212/36* (2006.01)
*C08L 25/18* (2006.01)

(52) U.S. Cl.
CPC ............ *C08F 212/36* (2013.01); *C08L 25/18* (2013.01); *C08L 2203/16* (2013.01); *C08L 2203/20* (2013.01)

(58) Field of Classification Search
CPC ............................ C08F 212/36; C08F 212/34
See application file for complete search history.

(56) References Cited

U.S. PATENT DOCUMENTS

| | | | | |
|---|---|---|---|---|
| 4,426,495 A * | 1/1984 | Vitus | C08L 21/00 525/92 F |
| 5,350,604 A * | 9/1994 | Crivello | C08F 12/34 525/289 |
| 2002/0132053 A1 | 9/2002 | Mccarthy et al. | |
| 2006/0270815 A1* | 11/2006 | Ittel | C08F 212/34 526/172 |
| 2018/0171189 A1* | 6/2018 | Ingratta | C08F 12/34 |
| 2018/0273752 A1 | 9/2018 | Lin et al. | |
| 2022/0195109 A1* | 6/2022 | Tian | C08F 12/34 |
| 2024/0002564 A1* | 1/2024 | Tian | C08J 5/244 |
| 2025/0367910 A1* | 12/2025 | Mhetar | B32B 15/082 |

FOREIGN PATENT DOCUMENTS

| | | |
|---|---|---|
| EP | 0128851 A2 | 12/1984 |
| EP | 4019557 A1 | 6/2022 |

OTHER PUBLICATIONS

Nuyken, et al., "Cationic Polymerization of bis(1-alkyvinyl)benzenes and related monomers", Makromol. Chem. 192,3071-3078 (1991).

* cited by examiner

*Primary Examiner* — Liam J Heincer

(57) ABSTRACT

The disclosure relates to a curable polymer composition comprising (i) a copolymer of a diisoalkenylarene (DIAEA) and a divinylarene (DVA), and (ii) at least one anti-scorching agent. The copolymer has a solubility in a hydrocarbon solvent at 25° C. for a period of less than 4 hours of at least 10 wt. %, a glass transition temperature ($T_g$) of 50 to 300° C., and a Gel Content of less than 5 wt. %. The curable polymer composition is cured at a temperature of greater than 140° C. to obtain a cured polymer composition having a Gel Content in a hydrocarbon solvent of >90%, and low Dk and Df values. The curable polymer composition does not cross-link or has minimal premature cross-linking in steps such as processing, storage, etc., and can be used in copper clad lamination applications.

20 Claims, No Drawings

CURABLE POLYMER COMPOSITION

RELATED APPLICATIONS

This application claims benefit to U.S. provisional application No. 63/367,531, filed on Jul. 1, 2022, which is hereby incorporated herein by reference.

FIELD

The disclosure relates to curable polymer compositions, methods of preparation, and applications thereof.

BACKGROUND

The electronic industries are interested in developing compact electronic equipment for different end use applications. Such miniaturized devices handle large capacity of information and need to have high frequency and high speed of signal transmission. One of the crucial parts of the miniaturized device is a circuit material having single or multi dielectric layers/laminates. Preferred dielectric layers for use in the manufacturing of substrates are characterized by low dielectric constants (Dk), low dissipation factors (Df) reduced coefficient of thermal expansion (CTE), etc.

Polymers with low Dk and Df need to have balance of other properties, e.g., mechanical properties, solubility in solvents, flow properties, etc., to be suitable for use in dielectric layer applications. Compositions containing cross-linked polymers can contribute for improving desired properties. Nonetheless, certain polymers in compositions are very reactive and difficult to have control over their reactivity while shipping, during storage, or when processing the composition. Anti-scorching agents or radical scavengers are known in the art to control reactivity of polymers in compositions, particularly to avoid premature cross-linking. However, such additives are either not effective to reduce/stop premature cross-linking of polymers or can have negative impact on Dk and Df.

Therefore, there is a need for a curable polymer composition having high cure rates, while minimizing premature cross-linking under standard processing conditions and provides improved electrical properties, e.g., a low Dk and Df.

SUMMARY

In one aspect, the disclosure relates to a curable composition comprising, consisting essentially of, or consists of (i) a copolymer of a diisoalkenylarene and a divinylarene and (ii) 0.001 to 10 wt. % of an anti-scorching agent. The copolymer has: a mole ratio of diisoalkenylarene to divinylarene of 1:15 to 15:1; a solubility in a hydrocarbon solvent at 25° C. for a period of less than 4 hours of at least 10 wt. %, measured according to Solubility Test as described in the specification; a glass transition temperature ($T_g$) of 50° C. to 300° C., measured according to ASTM D3418; and a Gel Content of less than 5 wt. %, based on total weight of the copolymer, measured according to Gel Content Test as described in the specification. The anti-scorching agent is selected from the group comprising of styrene, alpha-methyl styrene monomer, alpha-methyl styrene dimer, alpha-methyl styrene oligomer, hindered phenolic compounds, non-hindered phenolic compounds, benzimidazoles, and mixtures thereof, based on total weight of the curable polymer composition. The curable polymer composition at a concentration of 72.5 wt. % in toluene, after storing at 40° C. for 1 day, has a solution viscosity as measured by Brookfield Viscometer at 25° C. of at least 20% less than the solution viscosity of a polymer composition without the anti-scorching agent.

In a second aspect, the curable polymer composition has a mole ratio of diisoalkenylarene to divinylarene of 10:1 to 1:10.

In a third aspect, the copolymer has a solubility in a hydrocarbon solvent at 25° C. for a period of less than 4 hours of 10 to 75 wt. %.

In a fourth aspect, the copolymer has a Gel Content of 0.05 to 5 wt. %.

DESCRIPTION

The following terms will be used throughout the specification:

"At least one of [a group such as A, B, and C]" or "any of [a group such as A, B, and C]," or "selected from [A, B, and C], and combinations thereof" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C.

"Scorch" refers to a phenomenon where in the process of storage, processing, shipping, etc., of a polymer/composition, due to the effect of heat or light, the polymer/composition will undergo premature cross-linking and lose processing ability. The premature cross-linking is the cross-linking before curing the polymer/composition at normal processing conditions.

"Anti-Scorching Agent" refers to an additive to deactivate/terminate radicals prematurely generated during processing, shipping, storage, or the like, in a polymer/composition, with the reaction with the free radicals.

"Cured" or "cross-linked" is used interchangeably and refers to the formation of covalent bonds that link one polymer chain to another or link one polymerized repeating unit to another in the same polymer chain thereby altering the properties of a material.

"Molecular weight" or $M_w$ refers to the polystyrene equivalent molecular weight in g/mol or kg/mol of a polymer block or a block copolymer, or a copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC so calibrated are polystyrene equivalent molecular weights or apparent molecular weights. $M_w$ expressed herein is measured at the peak of the GPC trace and are commonly referred to as polystyrene equivalent "peak molecular weight," designated as $M_p$.

"Substantially Gel-Free" refers to a polymer containing <10, or <8, or <5, or <3, or <2, or <1 wt. % of a solid matter insoluble in a hydrocarbon solvent, e.g., toluene, cyclohexane, methyl-ethyl ketone (MEK), xylene, etc.

"Gel Content" refers to the insoluble contents of a cured polymer composition in toluene as a percentage of the cured polymer composition (prior to immersing in a hydrocarbon solvent). In embodiments, the Gel Content is >90 wt. % (toluene extractable of <10 wt. %), or >wt. % (toluene extractable of <5 wt. %), or >98 wt. % (toluene extractable of <2 wt. %).

"Gel Content Test" refers to a measurement of a Gel Content by placing a sample of a cured polymer composition having a weight G1 in 20 times volume of toluene, for a period of 4 hours at room temperature. Content in toluene is then filtered to recover the solid portion of the cured polymer composition, then dried to fully remove the solvent, and weighed, giving the insoluble content G2. Gel Content is calculated as (G2/G1). In embodiments, the Gel Content can also be measured by soaking the sample of the cured polymer composition at 90° C. for 9 hours followed by filtration of solid portion, drying, and recording weight.

"Solubility Test" refers to a measurement of a solubility by placing a polymer/copolymer sample in about 10 times volume of a hydrocarbon solvent, e.g., toluene, shake well and leave up to 4 hours at room temperature. Afterwards, examine the polymer/copolymer in the solvent by visual observation whether it has dissolved completely or partially. Decant or filter the content to measure weight of the remaining polymer/copolymer, after drying, to calculate weight of the dissolved polymer/copolymer.

"Swelling Content" refers to a weight difference (W %) of a weight of a cured polymer composition after being immersed in toluene until fully saturated (W2), i.e., the sample weight remains the same after a period of time, not soaking any more toluene, and the weight of the curable polymer composition before immersion (W1), calculated as:

$$W\% = (W2 - W1)/W1 * 100$$

Df indicates "Dissipation Factor" or "loss tangent" (Df) and is a measure of loss rate of electrical energy in a dissipative system.

Dk indicates dielectric constant or permittivity.

The disclosure relates to a curable polymer composition containing (i) a copolymer of a diisoalkenylarene (DIAEA) and a divinylarene (DVA) (DIAEA-DVA copolymer), and (ii) at least one anti-scorching agent. The curable polymer composition does not cross-link or has minimal cross-linking (premature cross-linking) in steps such as processing, storage, transport, etc., before intended curing step. The curable polymer composition when cured provides improved electrical properties, e.g., Dk and Df.

DIAEA-DVA Copolymer

The copolymer is disclosed and taught in U.S. patent application publication 2022/0195109 A1, incorporated herein by reference. The DIAEA-DVA copolymer can be obtained from the DIAEA and the DVA monomers by cationic polymerization in the presence of a Lewis acid catalyst or a Bronsted acid catalyst. In embodiments, the copolymerized DIAEA monomer comprises at least one of repeat units (A), (B), (C), and (D) whose structures are shown below, where $R^1$ is H or a $C_1$-$C_8$ alkyl group. The DIAEA-DVA copolymer can have any order of the repeat units of copolymerized DIAEA and DVA monomers.

(A)

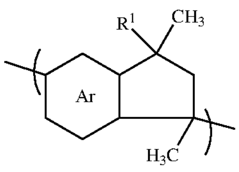

-continued (B)

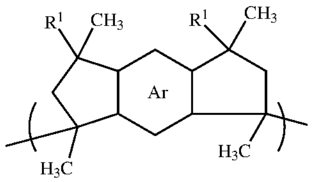

(C)

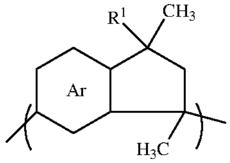

(D)

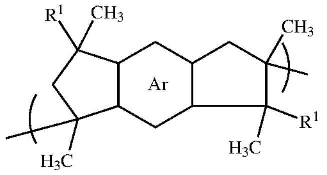

The DIAEA-DVA copolymer can have at least one terminal group selected from (E), (F), (G), and (H), having structures shown below.

(E)

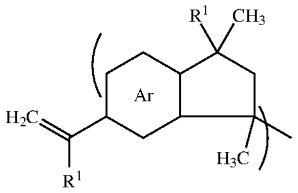

(F)

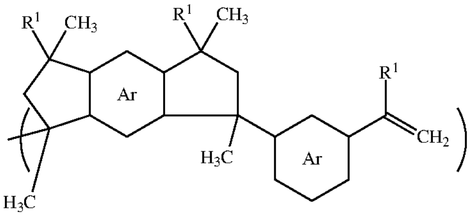

(G)

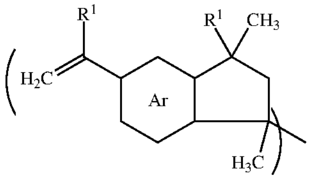

(H)

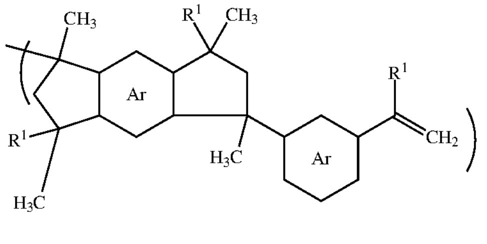

Non-limiting examples of DIAEA monomers to produce the copolymer include compounds having structures (I)

1,3-diisoalkenylarene, (II) 1,4-diisoalkenylarene, or mixtures thereof, wherein $R^1$ is methyl, ethyl, isopropyl, or n-butyl.

(I)

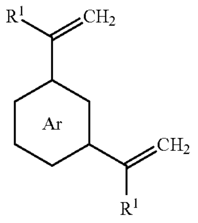

(II)

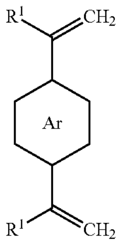

In embodiments, the DIAEA is selected from diisopropenylbenzenes (DIPEBs) and their substituted variants for producing the copolymer. Examples of DIPEBs include but are not limited to: 1,3-diisopropenylbenzene; 1,2-diisopropenylbenzene; 1,4-diisopropenylbenzene; 3,4-dicyclohexyl-1,2-diisopropenyl-benzene; 5-(3-methyl-cyclopentyl)-1,3-diisopropenylbenzene; 3-cyclopentyl-methyl-6-n-propyl-1,4-diisopropenylbenzene; 4-(2-cyclo-butyl-1-ethyl)-1,2-diisopropenylbenzene; 3-(2-n-propylcyclopropyl)-1,4-diisopropenylbenzene; 2-methyl-5-n-hexyl-1,3-diisopropenylbenzene; 4-methyl-1,2-diisopropenylbenzene; 5-ethyl-1,3-diisopropenylbenzene; 3-methyl-1,4-diisopropenylbenzene; and mixtures thereof.

In embodiments, the DVA is selected from the group consisting of divinylbenzene (DVB), divinylnaphthalene, divinylbiphenyl, divinyldiphenylether, and mixtures thereof. The DVB can include ortho-divinylbenzene, para-divinyl benzene, meta-divinylbenzene, trivinylbenzene, or mixtures thereof.

In embodiments, the copolymer further comprises repeat units derived from another polymerizable monomer including (i) a cyclodiene or a dimer thereof, (ii) an adduct of a cyclodiene and an acyclic diene, (iii) an allyl compound having two or more allyl groups, (iv) a vinyl compound having two or more vinyl groups other than the DVA, and any combination or sub-combination thereof.

Examples of other polymerizable monomers include 1,3-cyclohexadiene, 1,4-cyclohexadiene, 1,3-cyclopentadiene, alkyl cyclopentadiene, styrene, α-methylstyrene, para-methylstyrene, butadiene, isoprene, piperylene, divinyltoluene, divinylpyridine, divinylxylene, trivinylcyclohexane, ethylvinylbenzene, vinylnaphthalene, vinyltriisopropenoxysilane, methoxytrivinylsilane, tetravinylsilane, diethoxydivinylsilane, 2,4,6,8-tetravinyl-2,4,6,8-tetramethylcyclotetrasiloxane, and 2,4,6,8,10-pentamethyl-2,4,6,8,10-pentavinylcyclopentasiloxane, or mixtures thereof.

In embodiments, the DIAEA-DVA copolymer is any of a random, or block copolymer. Alternatively, the copolymer can contain a homopolymer of the DIAEA end capped with the DVA to obtain a DVA end capped polyDIAEA.

The copolymer can have at least one reactive terminal group selected from structures (E), (F), (G), and (H), and it can be suitably functionalized with a variety of functional groups, such as isocyanate, cyclic anhydride, carboxylic acid, carboxylic ester, or epoxy groups using methods known in the art.

In embodiments, the DIAEA-DVA copolymer has a molar ratio of DIAEA to DVA of 15:1 to 1:15, or 12:1 to 1:12, or 10:1 to 1:10, or 8:1 to 1:8, or 5:1 to 1:5, or 4:1 to 1:4, or 3:1 to 1:3, or 2:1 to 1:2, or 1:1.

In embodiments, the DIAEA-DVA copolymer has a number average molecular weight ($M_n$) of 1-10, 1.5-8, or 2-10, or 1-5, or >1, or <10 kg/mol; a weight average molecular weight ($M_w$) of 3-70, or 5-60, or 7-55, or 10-50 kg/mol; and a polydispersity index (PDI) of 2-20, 3-15, or 2-10, or 5-15.

In embodiments, the DIAEA-DVA copolymer is present in a solid form or as a solution in a hydrocarbon solvent with 20-75 wt. % concentration, or 30-75 wt. %, or >20 wt. %, or <75 wt. %, based on total weight of the solution.

In embodiments, the curable polymer composition comprises the DIAEA-DVA copolymer in an amount of 90-99.999, or 90-99.995, or 90-99.99, or 99-99.95, or 95-99.999, or 95-99.995, or 95-99.99, or 95-99.95 wt. %, based on total weight of the curable polymer composition, excluding the amount of glass fiber.

Method of Preparation of DIAEA-DVA Copolymer

The DIAEA-DVA copolymer can be prepared by known process in the art and disclosed and taught in U.S. Patent Application Publication 2022/0195109 A1, incorporated herein by reference. In embodiments, the copolymer is prepared by polymerizing DIAEA and DVA under cationic conditions in a suitable solvent in the presence of a catalyst, e.g., a Bronsted acid, or a Lewis acid. The monomers/comonomers addition can be carried at a suitable temperature and for sufficient time and the polymerization continued until all the monomers/comonomers have essentially disappeared, or alternately, until an analysis of the reaction mixture indicates that the copolymer of sufficient molecular weight has formed. At the end of the reaction, the copolymer can be isolated by quenching the reaction mixture with water, followed by separating the organic solvent layer and stripping the solvent. Trace organics can be removed from the product under high vacuum.

Anti-Scorching Agent

Anti-scorching agents prevent premature cross-linking of the vinyl groups in the copolymer before the targeted curing step. Anti-scorching agents can allow the curing to happen at desired higher temperature. The effectiveness of the anti-scorching agent can be identified by the duration of scorch delay, the temperature at which the cross-linking begins, and the effect it has on the cure extent of the copolymer.

In embodiments, the anti-scorching agent is selected from the group comprising of styrene, alpha-methyl styrene monomer (AMSM), alpha-methyl styrene dimer (AMSD), alpha-methyl styrene oligomer (AMSO), hindered phenolic compounds which are substituted by an alkyl group, a phenyl group, or the like at the ortho position to at least one phenolic OH group, non-hindered phenolic compounds, amine compounds, thiourea compounds, benzimidazoles, mixtures and derivatives thereof. The alpha-methyl styrene derivatives can have one or more functional groups located on each ring and can be all same or different.

In embodiments, the alpha-methyl styrene dimer is selected from the group consisting of 2,4-diphenyl-4-methyl-1-pentene, 2,4-diphenyl-4-methyl-2-pentene, 1,2-trimethyl-3-phenylindane, cis-1,3-dimethyl-1,3-diphenyl cyclobutene, trans-1,3-dimethyl-1,3-diphenyl cyclobutene, and mixtures thereof.

In embodiments, the alpha-methyl styrene derivative has a formula (J):

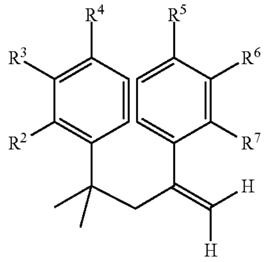

(J)

wherein $R^2$, $R^3$, $R^4$, $R^5$, $R^6$, and $R^7$ are each independently selected from the group consisting of hydrogen, —CH(O), —CN, isocyanato, thioisocyanato, $SO_3H$ and salts and esters thereof, $NR^8R^9$, silane, halogen, $C(O)OR^{10}$, —C(O)$NR^{11}R^{12}$, —$CR^{13}$(O), —C(O)OC(O)$R^{14}$, —C(O)$NR^{15}COR^{16}$, —OC(O)$R^{17}$, —$OR^{18}$, substituted and unsubstituted alkyl, substituted and unsubstituted alkenyl, substituted and unsubstituted alkynyl, and substituted and unsubstituted aryl; $R^8$, $R^9$, $R^{10}$, $R^{11}$, $R^{12}$, $R^{13}$, $R^{14}$, $R^{15}$, $R^{16}$, and $R^{17}$ are each independently selected from the group of H, alkyl, aryl, substituted alkyl or substituted aryl; $R^{18}$ is selected from the group of alkyl, aryl, substituted alkyl or substituted aryl; $R^2$, $R^3$, $R^4$, $R^5$, $R^6$, and $R^7$ cannot all simultaneously be hydrogen. The alkyl and substituted alkyls can have a chain consisting of 1 to 12 carbons. It is also preferred that substituents located on the substituted alkyl or substituted aryl are free of functionalities that could substantially interfere with free radical polymerization.

In embodiments, the anti-scorching agent is based on hydrocarbons without any heteroatom or polar groups.

Examples of anti-scorching agents include 2,6-di-t-butyl-p-cresol, 2,2'-methylene-bis-(4-methyl-6-t-butylphenyl), 4,4'-thio-bis-(6-t-butyl-3-methylphenol), 1,3,5-trimethyl-2,4,6-tris-(2',6'-di-t-butyl-p-cresyl)benzene, 4,4'-butylidene-bis-(6-t-butyl-3-methylphenol), (2,2,6,6-Tetramethylpiperidin-1-yl)oxyl (TEMPO), bis(2,2,6,6-tetramethyl-4-piperidinyl)sebacate (bis-TEMPO), 4-acryloyloxy-2,2,6,6-tetramethylpiperidine-N-oxyl (AOTEMPO), 1,1-diphenylethylene (DPE), 4-methacryloyloxy-2,2,6,6-tetramethylpiperidine-N-oxyl, 4-cinnamoyloxy-2,2,6,6-tetramethylpiperidine-N-oxyl, 4-crotonoyloxy-2,2,6,6-tetramethylpiperidine-N-oxyl, 1-cyclohexyloxy-2,2,6,6-tetramethylpiperidin-4-ol, 1-methoxy-2,2,6,6-tetramethylpiperidin-4-ol, 1-cyclohexyloxy-2,2,6,6-tetramethylpiperidin-4-yl acrylate, 1-methoxy-2,2,6,6-tetramethylpiperidin-4-yl acrylate, 2,5-di-tert-amyl-hydroquinone, isotridecyl-3-(3,5-di-tert-butyl-4-hydroxyphenyl)proprionate, C-13 to C-15 alcohol ester, 3-(3,5-di-tert-butyl-4-hydroxyphenyl)propionate, poly(oxy-alkylene) chain(s) substituted 3-arylbenzofuranones, poly (caprolactone) chain(s) substituted 3-arylbenzofuranones, methoxyallylphenyl allylether (MAPAE), dibutyl maleate, allyl malonic ester, various mono-allylic compounds, nonyl maleate ester, diethyl fumarate, 4-hydroxy styrene, 4-vinylaniline, butylated hydroxytoluene (BHT), stilbenequinone, alkylated diphenyl amine, quinone imine, hindered phenols, bisphenols, thiobisphenols, substituted hydroquinones, tris(alkylphenyl)phosphites, dialkylthiodipropionates, phenylnaphthylamines, substituted diphenylamines, dialkyl, alkyl aryl, and diaryl substituted p-phenylene diamines, monomeric and polymeric dihydroquinolines, 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole, and its zinc salt, petroleum waxes, tetrakis[methylene(3,5-di-tert-butyl-4-hydroxy-hydro-cinnamate)]methane, bis[(beta-(3,5-ditert-butyl-4-hydroxybenzyl)-methylcarboxyethyl)]sulphide, 4,4'-thiobis (2-methyl-6-tertbutylphenol), 4,4'-thiobis(2-tert-butyl-2,2'-thiobis(4-methyl-6-tert-butylphenol), thiodiethylene bis(3, 5-di-tert-butyl-4-hydroxy)hydrocinnamate, tris(2,4-di-tert-butylphenyl)phosphite, di-tert-butylphenyl-phosphonite, thio compounds such as dilaurylthiodipropionate, dimyristylthiodipropionate, and distearylthiodipropionate, siloxanes, polymerized 2,2,4-trimethyl-1,2-dihydroquinoline, n,n'-bis(1,4-dimethylpentyl-p-phenylenediamine), alkylated diphenylamines, 4,4'-bis(alpha,alpha-demthylbenzyl)diphenylamine, diphenyl-p-phenylenediamine, mixed di-aryl-p-phenylenediamines, 2,2'-oxamido bis-(ethyl-3-(3, 5-di-tertbutyl-4-hydroxyphenyl)propionate), 2,2'-oxamido bis-(ethyl-3-(3,5-di-tertbutyl-4-hydroxyphenyl)propionate), 4,4'-isopropylidene-diphenol, phenyl-(3-naphthylamine, phenyl-α-naphthylamine, diphenyl-p-phenylene diamine, 1,3-bis-(dimethylaminopropyl)-2-thiourea, and mixtures thereof.

In embodiments, the anti-scorching agent is a metal salt selected from the group consisting of bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium dimethyldithiocarbamate, tellurium diethyldithiocarbamate, zinc diamyldithiocarbamate, zinc diethyldithiocarbamate, zinc dimethyldithiocarbamate, selenium dimethyldithiocarbamate, and mixtures thereof.

In embodiments, the curable polymer composition contains a single anti-scorching agent or a mixture of two or more anti-scorching agents. The mixture of anti-scorching agents can have at least one anti-scorching agent based on the alpha-methyl styrene dimer, and/or based on hydrocarbons without any heteroatom or polar groups.

In embodiments, the anti-scorching is added in the curable polymer composition in amounts of 0.001-10, or 0.005-10, or 0.010-10, or 0.050-10, or 0.001-5, or 0.005-5, or 0.010-5, or 0.050-5 wt. %, based on total weight of the curable polymer composition, excluding the amount of glass fiber.

Optional Components

The curable polymer composition further comprises at least an additive selected from initiators, activators, curing agents, stabilizers, neutralizing agents, thickeners, coalescing agents, antioxidants, antiozonants, color change pH indicators, plasticizers, tackifiers, film forming additives, dyes, pigments, cross-linking agents, UV absorbers, UV stabilizers, catalysts, fillers, other polymers, fibers, flame retardants, viscosity modifiers, wetting agents, deaerators, toughening agents, adhesion promoters, colorants, heat stabilizers, lubricants, flow modifiers, drip retardants, antistatic agents, processing aids, accelerator, water resistant agents, water-proofing agents, thermal conductivity-imparting agents, electromagnetic wave shielding property-imparting agents, fluorescent agents, radical scavengers, and mixtures thereof.

Non-limiting examples of accelerators include dibenzothiazole, N-cyclohexyl-2-benzothiazole, N-cyclohexyl-2-benzothiazole sulfenamide (CBS), N,N-dicyclohexyl-2-benzothiazole sulfenamide (DCBS), thiocarbamyl sulfenamide, 2-(4-morpholinothio)-benzothiazole (MBS), N-oxydiethylene thiocarbamyl-N-oxydiethysulfonamide (OTOS), 2-mercaptobenzothiazole (MBT), 2-2'-dithiobis(benzothiazole) (MBTS), tetramethylthiuram disulfide (TMTD), N-tertiary-butyl-2-benzothiazole sulfonamide (TBBS), dipentamethylene thiuram tetrasulfide (DPTT), 4,4'-dithiodimorpholine (DTDM), zinc dimethyl dithiocarbamate, thiourea, xanthates, thiophosphates, 2-mercaptobenzothiazole zinc salt (ZMBT), 2-(4-morpholinodithio) benzothiazole (MDB), diethylthiocarbamoyl-2-mercaptobenzothiazole, and mixtures thereof.

In embodiments, the curable polymer composition further comprises a thermal or radiation initiator selected from hydroperoxides, liquid peroxydicarbonates, dialkyl peroxides, diperoxyketals, monoperoxy carbonates, cyclic ketone peroxides, diacyl peroxides, dicumyl peroxide (DCP), t-butyl cumyl peroxide, organosulfonyl peroxides, 1,3-bis-(t-butylperoxyisopropyl)benzene, 2,5-dimethyl-2,5-di-(t-butylperoxy)hexane, 2,5-dimethyl-2,5-(t-butylperoxy) hexane-3,2,5-dimethyl-2,5-di(t-amylperoxy)hexane, 2,5-di (tert-butylperoxy)-2,5-dimethyl-3-hexyne, di-t-butylperoxide, α,α-di[(t-butylperoxy)-isopropyl]benzene, di-t-amyl peroxide, 1,3,5-tri-[(t-butylperoxy)isopropyl]benzene, peroxyesters, 1,1-di(t-butylperoxy)-3,3,5-trimethylcyclohexane, 1,1-di(t-butylperoxy)cyclohexane, n-butyl 4,4-di (t-butylperoxy)valerate, ethyl 3,3-di(t-butylperoxy)butyrate, ethyl 3,3-di(t-amylperoxy)butyrate, 2,2-di(t-amylperoxy) propane, 3,6,6,9,9-pentamethyl-3-n-butyl-1,2,4,5-tetraoxacyclononane, 3,6,6,9,9-pentamethyl-3-ethoxycarbonylmethyl-1,2,4,5-tetraoxacyclononane, and mixtures thereof.

In embodiments, the additive used in amounts of 0.1-10, or 0.5-8, or 0.1-5, based on total weight of the curable polymer composition.

In embodiments, the curable polymer composition further comprises polymers other than the DIAEA-DVA copolymer. Examples of such other polymers include 1,2-polybutadiene, polyisoprene, polybutadiene-polyisoprene copolymers, polybutadiene-polystyrene-polydivinyl-benzene terpolymers, polyphenylene ether, curable cyclic olefins or their copolymers, polyacrylates, polydicyclopentadiene, styrene-isoprene-styrene copolymers, butadiene-acrylonitrile copolymers, acrylonitrile-styrene resin, acrylonitrile-butadiene-styrene resin, polyesters, styrenic block copolymer, polyolefins, polytetrafluoroethylene (PTFE), polyetherimide (PEI), maleimide resin, cyanate ester resin, epoxy resin, phenolic resin, benzoxazine resin, polyamide resin, polyimide resin, polyphenylene ether, polyphenylene sulfide, polyacetal, polysulfone, polyesterimides, polyether sulfone, polyether ketone, fluorine resin, and mixtures thereof.

In embodiments, the curable polymer composition further comprises rubbery polymers selected from natural rubber (NR), butyl rubber, halogenated butyl rubber, and EPDM (ethylene propylene diene monomer rubber), styrene-butadiene rubber (SBR), butadiene rubber, synthetic polyisoprene rubber, epoxylated natural rubber, polybutadiene rubber, high-cis polybutadiene rubber, ethylene propylene diene monomer rubber, ethylene propylene rubber, maleic acid-modified ethylene propylene rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, polyamide elastomers, and mixtures thereof.

Any suitable amounts of other polymers and/or rubbery polymers can be incorporated into the curable polymer composition, based on desired end use application. Such polymers, if used, in amounts ranging from 10-99, or 15-95, or 20-70, or 25-60, or 30-55, or >25, or <50 wt. %, based on total weight of the curable polymer composition, excluding the amount of glass fiber.

Method of Preparation of Curable Polymer Composition

The curable polymer composition can be prepared by any process known in the art, e.g., compounding, blending, or in solution. In embodiments, the curable polymer composition is compounded by mixing all components of the composition. The compounding can be achieved by any conventional mixing or compounding operation, e.g., single, and twin screw extruders. The mixing temperatures can be chosen in such a way that an intimate blend of the components is obtained and maintained after cooling, without premature cross-linking.

In embodiments, the curable polymer composition contains a mixture of the copolymer, the anti-scorching agent, and optional components. To this mixture, the cross-linking agent can be added and performed the curing of the composition.

In embodiments, the anti-scorching agent is added to the copolymer along with optional components to form the curable polymer composition, followed by the addition of the cross-linking agent, and then subjecting the composition to curing.

In embodiments, the curable polymer composition is prepared by mixing all components in a hydrocarbon solvent, e.g., toluene and stirring for sufficient period to obtain a curable polymer composition in solution. A concentration of the curable polymer composition (total solid contents) in the hydrocarbon solvent can be from 10-80 wt. %, or 20-75 wt. %, or 25-80 wt. %, or 30-75 wt. %, or >20 wt. %, or <75 wt. %, based on total weight of the solution.

The curable polymer composition can be used as is, e.g., in a solvent, or can be made into a film for end-use applications downstream, e.g., cured/or cross-linked for use in CCL applications, etc.

In embodiments, a polymer composition is prepared comprising the DIAEA-DVA copolymer and the optional components but does not contain the anti-scorching agent. The polymer composition can be used to compare certain properties with the curable polymer composition.

Curing of Curable Polymer Composition

The curable polymer composition can be cured by using an external source, e.g., heat, ultraviolet light (UV), visible light, electron beam, or combinations thereof, to obtain a cured polymer composition. The curing of the composition can be conducted with or without initiator.

In embodiments, the curing of the curable polymer composition is carried out at a temperature of 140-250° C., or 145-220° C., or 150-210° C., or 155-200° C., or >140° C., or >150° C., and for a period of 0.5-60 minutes, or 1-50 minutes, or 5-40 minutes, or 10-30 minutes.

In embodiments, the curable polymer composition is cured at a temperature of at least 30° C. higher than the curing temperature of a polymer composition without the anti-scorching agent. In embodiments, the curable polymer composition is cured at a temperature of at least 35° C., or at least 40° C., or at least 45° C. higher compared to a curing temperature of a polymer composition without the anti-scorching agent.

In embodiments after curing, >60%, or >65%, or >70%, or >75%, or >80%, or >85%, or >90%, or >99% of vinyl groups in the DIAEA-DVA copolymer are consumed for the crosslinking step (based on total vinyl groups present in the DIAEA-DVA copolymer before curing).

Properties of DIAEA-DVA Copolymer and Curable Polymer Composition

In embodiments, the DIAEA-DVA copolymer is a resinous material having a good combination of molecular weight ranges and relatively broad molecular weight distributions (polydispersity index), which in part makes it more soluble in non-polar solvents, thereby enhancing their processibility.

In embodiments, the DIAEA-DVA copolymer has a solubility in a hydrocarbon solvent at 25° C. for a period of less than 4 hours of at least 10, or >20, or >30, or >50, or >70, or <99, or 10-75, or 20-65, or 10-60 wt. %, based on total weight of the solvent. Examples of solvents include hexane, heptane, octane, isooctane, cyclohexane, varnish maker and painter's naphtha (VM&P naphtha), petroleum ether, toluene, xylene, and mixtures thereof.

In embodiments, the DIAEA-DVA copolymer as a solid when dissolved in a hydrocarbon solvent forms a substantially gel-free solution, wherein <2, or <5, or <10, <15 wt. % of the solid remains insoluble in the solvent.

In embodiments, the DIAEA-DVA copolymer solution, in the hydrocarbon solvent, has a Gel Content of 0.05-5, or 0.1-4.5, or 1-4, or <5 wt. %, or <2 wt. %, or <1 wt. %, based on total weight of the copolymer.

In embodiments, the DIAEA-DVA copolymer has a decomposition onset temperature of 200-450° C., or 220-420° C., or 240-400° C., or <600° C., or <500° C. or >300° C.

In embodiments, the DIAEA-DVA copolymer has a glass transition temperature ($T_g$) of 50-300° C., or 60-250° C., or 70-220° C., or 80-200° C., or 100-250° C., or 120-220° C. or >150° C., or <250° C., or <200° C., measured using differential scanning colorimetry (DSC) according to ASTM D3418 or DMA (dynamic mechanical analyzer).

In embodiments, the DIAEA-DVA copolymer has a moisture absorption coefficient of <0.1, or <0.08, or <0.05, measured at 25° C. according to ASTM D570.

In embodiments, the DIAEA-DVA copolymer has a density of >0.9, or >1.0, or 1.0-2.0, or 1.0-1.50 g/cc.

In embodiments, a curable polymer composition having a concentration of 72.5 wt. % in toluene, after storing at 40° C. for 1 day, has a solution viscosity at 25° C. of at least 20% less, or at least 30% less, or at least 40% less than the solution viscosity of a polymer composition without the anti-scorching agent.

In embodiments, a curable polymer composition having a concentration of 72.5 wt. % in toluene and after aging at 40° C. for 50 days, has an increase in a solution viscosity of <30%, or <25%, or <20%, or <15%, compared with the initial solution viscosity (before aging).

In embodiments, the curable polymer composition having a concentration of 72.5 wt. % in toluene after aging at 40° C. for 100 days, has increase in a solution viscosity of <50%, or <45%, or <40%, or <35%, compared with the initial solution viscosity (before aging).

In embodiments, the curable polymer composition having a concentration of 72.5 wt. % in toluene after aging at 40° C. for 181 days, has increase in a solution viscosity of <50%, or <45%, or <40%, compared with the initial solution viscosity (before aging).

In embodiments, the curable polymer composition has a gel point of >125° C., or >130° C., or >132° C., or >135° C., or >138° C., or >140° C., measured on a film sample of the curable polymer composition dried at 120° C. for 5 minutes, using Discovery Hybrid Rheometer (DHR).

In embodiments, the curable polymer composition has a gel point of >135° C., or >140° C., or >145° C., or >150° C., measured on a film sample dried at 35° C. for 5 minutes, using Discovery Hybrid Rheometer (DHR).

In embodiments, the curable polymer composition has a gel point of at least 10%, or at least 15%, or at least 20% higher than a polymer composition without the anti-scorching agent, as measured on film samples dried at 120° C. for 5 minutes, using Discovery Hybrid Rheometer (DHR).

Properties of Cured Polymer Composition

The cured polymer composition having high practical utility can be obtained without occurrence of the undesired scorching phenomenon because of excellent cross-linking characteristics. Cured polymer compositions have varying degrees of toughness, flexibility, good chemical and oxidative stability, and enhanced fire retardancy useful for electronic applications.

In embodiments, the cured polymer composition has a Dk (permittivity) of <2.7, or <2.65, or <2.60, or <2.55, measured at 10 GHz, according to ASTM D2520.

In embodiments, the cured polymer composition has a Df (loss tangent) of <0.006, or <0.005, or <0.004, or 0.003-0.0001, or 0.002-0.0001, measured at 10 GHz, according to ASTM D2520.

In embodiments, the curable polymer composition during the curing process has an exothermic energy value of >80, or >100, or >120, or >140, or >160, or >180, or >200 J/g, or 60-220, or 80-210, or 100-200 J/g. The exothermic energy is an indication of the degree of cross-linking, which can be measured by analyzing the exothermic peak obtained by raising the temperature from room temperature to 300 or 400° C. at a rate of 10° C./min using a differential scanning calorimeter (DSC).

The cured polymer composition has good adhesion to metals, e.g., aluminum, copper, etc. In embodiments, the cured polymer composition has a 180° peel strength to metal of 0.1-1.0, or 0.2-0.9, or 0.3-0.7 N/m.

In embodiments, the cured polymer composition has a Swelling Content at room temperature, of <30%, or <25%, or <20%, or <15%, or <10%, or <5%, or 0-30%, or 0-20%, or 0-10%, based on total initial weight of the cured polymer composition.

In embodiments, the cured polymer composition has a Swelling Content at 90° C. of <30%, or <25%, or <20%, or <15%, or <10%, or <7%, or 0-30%, or 0-20%, or 0-10%, based on total initial weight of the cured polymer composition.

In embodiments, the cured polymer composition has a Gel Content at room temperature after 4 hours, of >85%, or >88%, or >90%, or >95%, or >98%, or >99%, or up to 100%, based on total weight of the cured polymer composition.

In embodiments, the cured polymer composition has a Gel Content at 90° C. after 9 hours, of >85%, or >88%, or >90%, or >95%, or >98%, or >99%, or up to 100%, based on total weight of the cured polymer composition.

In embodiments, a cured polymer composition containing 40 wt. % of glass fiber, (based on total weight of the cured polymer composition) has a coefficient of thermal expansion (CTE) of 5-40, or 10-25, or 15-20 ppm/° C. in the XY plane, and of 30-120, or 40-95, or 45-85 ppm/° C. in the Z direction, as measured using DMA over a range of −50 to 300° C.

Applications of Curable Polymer Composition

The curable polymer composition can be used in coating applications for automotive, e.g., refinishes, primers, basecoats, undercoats, overcoats, clear coats, etc. Power cables can be obtained from the curable polymer composition, particularly, cables in high voltage applications, and useful in both, alternating current (AC) and direct current (DC) applications.

The curable polymer composition can be valuable for use as metal-clad laminates, e.g., copper clad laminates (CCL), electrical appliance housings, electrical cables, electrical connectors, electronic switches, and electronic components, such as printed circuit boards (PCBs), printed wiring boards, and flexible printer circuits (FPC).

Prepregs used for making the PCBs can be made using the curable polymer composition, in combination with a rubber component, and optional additives, by processes known in the art. In embodiments, the curable polymer composition comprises fiber glass for preparation of PCBs. Fiber glass can be pre-treated with an organosiloxane, e.g., polyalkylsiloxane, polyarylsiloxane, etc., to increase adhesion between the fiber glass and the copolymer.

In embodiments, CCL includes a metal foil disposed on one or both sides of an insulating layer made from the cured polymer composition. Further, CCL can include a barrier layer disposed at a side of the surface in contact with the insulating layer. The barrier layer can contain a metal such as cobalt, capable of reducing the transmission loss. The barrier layer can be formed by a plating process, e.g., sputtering, electroplating or electroless plating. A stacked laminate of the desired thickness can be produced by stacking the individual laminates and subjecting them to heating, e.g., at temperatures ranging from 110-220° C., or 120-210° C., or 125-180° C., and pressures e.g., 0.5-20, or 1-18, or 2-15, or 5-12 MPa, for a period ranging from 10 minutes-5 hours, or 20 hours-2 hours.

EXAMPLES

The following examples are intended to be non-limiting.

Solution viscosities of curable polymer compositions are measured by Brookfield Viscometer. Concentration in a hydrocarbon solvent is a total solid content, e.g., copolymer with or without anti-scorching agent. Concentration can be ranging from 10 to 80 wt. %, based on total weight of the solution.

Rheological properties, e.g., gel point, are measured by using Discovery Hybrid Rheometer (DHR) from TA Instruments.

The components used in examples include:

Anti-scorching agent-1 (ASA-1) is a sulfur containing phenolic compound.

Anti-scorching agent-2 (ASA-2) is a nitrogen containing cyclic compound.

Example 1

Preparation of copolymer of 1,3-DIPEB and 1,3-divinylbenzene. In a 3-liter 3-neck flask charged with 921 g of cyclohexane and heated up to 65° C., added 0.0125 g of triflic acid with continuous stirring. A mixture of 64.5 g of 1,3-DIPEB, 185.7 g of 1,3-divinylbenzene, and 250 g of cyclohexane was added over 30 min. After addition of the mixture, the reaction content was quenched with 750 mL of water and 2 g of $NaHCO_3$ followed by heating the reaction content at 65° C. for another 15 minutes. The aqueous layer was removed from the bottom. The remaining organic layer was washed with water several times. The copolymer product was recovered by removing the solvent.

Example 2

Curable polymer compositions were prepared with 50 wt. % concentration of the copolymer of Example 1 and an anti-scorching agent (in varying amounts) in toluene. Samples were allowed to age in an oven at different temperatures and varying durations. Evaluation of viscosity change was conducted by visual observation of the samples and comparative example 2a without anti-scorching agent. Table 1 presents data and results of various samples after visual observations.

TABLE 1

| Samples | Anti-scorching agent and amount (wt. %) | 40° C. | | | | 60° C. | | | | 80° C. | | | |
|---|---|---|---|---|---|---|---|---|---|---|---|---|---|
| | | 1 day | 2 days | 3 days | 8 days | 1 day | 2 days | 3 days | 4 days | 1 day | 2 days | 3 days | 4 days |
| Ex. 2a | — | U | U | U | U | U | V | V | V | V | G | G | G |
| Ex. 2b | ASA-1 (0.0100) | U | U | U | U | U | U | U | V | V | G | G | G |
| Ex. 2c | ASA-1 (0.0250) | U | U | U | U | U | U | U | V | V | G | G | G |
| Ex. 2d | ASA-1 (0.0350) | U | U | U | U | U | U | U | U | U | G | G | G |

TABLE 1-continued

| Samples | Anti-scorching agent and amount (wt. %) | 40° C. 1 day | 40° C. 2 days | 40° C. 3 days | 40° C. 8 days | 60° C. 1 day | 60° C. 2 days | 60° C. 3 days | 60° C. 4 days | 80° C. 1 day | 80° C. 2 days | 80° C. 3 days | 80° C. 4 days |
|---|---|---|---|---|---|---|---|---|---|---|---|---|---|
| Ex. 2e | ASA-1 (0.0500) | U | U | U | U | U | U | U | U | U | U | U | V |
| Ex. 2f | ASA-1 (0.0750) | U | U | U | U | U | U | U | U | U | U | U | V |
| Ex. 2g | ASA-1 (0.1000) | U | U | U | U | U | U | U | U | U | U | U | V |
| Ex. 2h | ASA-2 (0.0100) | U | U | U | U | U | U | U | U | U | G | G | G |
| Ex. 2i | ASA-2 (0.0250) | U | U | U | U | U | U | U | U | U | U | U | V |
| Ex. 2j | ASA-2 (0.0350) | U | U | U | U | U | U | U | U | U | U | U | V |
| Ex. 2k | ASA-2 (0.0500) | U | U | U | U | U | U | U | U | U | U | U | U |
| Ex. 2l | ASA-2 (0.0750) | U | U | U | U | U | U | U | U | U | U | U | U |
| Ex. 2m | ASA-2 (0.1000) | U | U | U | U | U | U | U | U | U | U | U | U |

U—viscosity unchanged, V—viscosity increased, G—Gelled up solid.

Example 3

Film samples of curable polymer compositions were prepared by combining the copolymer in Example 1 and different anti-scorching agents (in varying amounts) in toluene having 70 wt. % concentration, and then solvent casting on to silicon substrate. Each film of 100 microns thick was allowed to dry for 1 hour at room temperature followed by at 120° C. for 5 minutes. Film samples were then removed from silicon substrate for measurement of gel point by using DHR. Results are shown in Table 2. Comparable is example 3a.

TABLE 2

| Samples | Anti-scorching agent and amount (wt. %) | Gel Point (° C.) |
|---|---|---|
| Ex. 3a | — | 124 |
| Ex. 3b | ASA-1 (0.0025) | 139 |
| Ex. 3c | ASA-1 (0.0050) | 130 |
| Ex. 3d | ASA-1 (0.0100) | 145 |
| Ex. 3e | ASA-1 (0.0250) | 156 |
| Ex. 3f | ASA-1 (0.0350) | 135 |
| Ex. 3g | ASA-1 (0.0500) | 142 |

TABLE 2-continued

| Samples | Anti-scorching agent and amount (wt. %) | Gel Point (° C.) |
|---|---|---|
| Ex. 3h | ASA-1 (0.0750) | 161 |
| Ex. 3i | ASA-1 (0.1000) | 164 |
| Ex. 3j | ASA-2 (0.0025) | 149 |
| Ex. 3k | ASA-2 (0.0050) | 145 |
| Ex. 3l | ASA-2 (0.0100) | 155 |
| Ex. 3m | ASA-2 (0.0250) | 162 |
| Ex. 3n | ASA-2 (0.0350) | 165 |
| Ex. 3o | ASA-2 (0.0500) | 163 |
| Ex. 3p | ASA-2 (0.0750) | 168 |
| Ex. 3q | ASA-2 (0.1000) | 172 |

Example 4

Curable polymer compositions were prepared in toluene with 72.5 wt. % concentration of the copolymer of Example 1 and anti-scorching agents (in varying amounts). These samples were kept for aging in an oven at 40° C. for up to 181 days. Visual observations were made for each sample and viscosities were measured by using DHR at 25° C. Results are shown in table 3. Comparable is example 4a.

TABLE 3

| Samples | Anti-scorching agent and amount (wt. %) | | Aging (in days) at 40° C. 1 | 7 | 17 | 23 | 32 | 35 | 40 | 50 | 66 | 85 | 100 | 131 | 181 |
|---|---|---|---|---|---|---|---|---|---|---|---|---|---|---|---|
| Ex. 4a | — | Viscosity | 388 | 2090 | — | — | — | — | — | — | — | — | — | — | — |
| Ex. 4b | ASA-1 (0.0250) + ASA-2 (0.0030) | (cPs) | 156 | 177 | 151 | 168 | 176 | 165 | 163 | 169 | 156 | 157 | 207 | 163 | 188 |
| Ex. 4c | ASA-1 (0.0300) + ASA-2 (0.0025) | | 123 | 142 | 130 | 128 | 126 | 127 | 125 | 118 | 119 | 147 | 163 | 160 | 169 |

TABLE 3-continued

| Samples | Anti-scorching agent and amount (wt. %) | Aging (in days) at 40° C. 1 | 7 | 17 | 23 | 32 | 35 | 40 | 50 | 66 | 85 | 100 | 131 | 181 |
|---|---|---|---|---|---|---|---|---|---|---|---|---|---|---|
| Ex. 4d | ASA-1 (0.0325) + ASA-2 (0.0020) | 125 | 119 | 117 | 122 | 116 | 138 | 130 | 108 | 125 | 129 | 126 | 138 | 146 |
| Ex. 4e | ASA-1 (0.0350) + ASA-2 (0.0015) | 119 | 135 | 123 | 173 | 148 | 156 | 144 | 129 | 149 | 152 | 158 | 190 | 211 |

Example 5

Gel point measurements were carried out for film samples prepared by repeating the procedure of Example 3, except with a combination of two anti-scorching agents. Each film was allowed to dry for 1 hour at room temperature followed by at 35° C. or 120° C. for 5 minutes. Film samples were then removed from silicon substrate for measurement of gel point by using DHR as shown in table 4. Thickness of each film was 100 microns. Comparable are examples 5a and 5f.

TABLE 4

| Samples | Film drying temperature (° C.) (for 5 minutes) | ASA-1 (wt. %) | ASA-2 (wt. %) | Gel Point (° C.) |
|---|---|---|---|---|
| Ex. 5a | 35° C. | — | — | 127 |
| Ex. 5b | 35° C. | ASA-1 (0.0250) | ASA-2 (0.0030) | 158 |
| Ex. 5c | 35° C. | ASA-1 (0.0300) | ASA-2 (0.0025) | 158 |
| Ex. 5d | 35° C. | ASA-1 (0.0325) | ASA-2 (0.0020) | 158 |
| Ex. 5e | 35° C. | ASA-1 (0.0350) | ASA-2 (0.0015) | 160 |
| Ex. 5f | 120° C. | — | — | 135 |
| Ex. 5g | 120° C. | ASA-1 (0.0250) | ASA-2 (0.0030) | 162 |
| Ex. 5h | 120° C. | ASA-1 (0.0300) | ASA-2 (0.0025) | 159 |
| Ex. 5i | 120° C. | ASA-1 (0.0325) | ASA-2 (0.0020) | 161 |
| Ex. 5j | 120° C. | ASA-1 (0.0350) | ASA-2 (0.0015) | 152 |

Example 6

Preparation of a cured polymer composition. Samples 5f and 5i from Example 5 were separately blended with 0.5 wt. % of dicumyl peroxide. Each sample was placed in a mold and pressed at 100° C. for 5 minutes at 8,000 psi followed by pressed at 180° C. for 2 hours at 20,000 psi. Samples were measured for Gel Content (4 hrs. at room temperature), Swelling Content (4 hrs. at room temperature), Dk and Df. Results are shown in Table 5.

TABLE 5

| Samples | Thermal initiator (wt. %) | Gel Content (%) | % Dissolved in toluene | Swelling content (wt. %) | Dk (10 GHz) | Df (10 GHz) |
|---|---|---|---|---|---|---|
| 5f-CR-1 | — | 98.47 | 1.53% | 13.62 | — | — |
| 5f-CR-2 | 0.5 | 99.53 | 0.47% | 6.43 | — | — |
| 5i-CR-3 | — | 99.56 | 0.44% | 6.57 | — | — |
| 5i-CR-4 | 0.5 | 99.32 | 0.68% | 4.77 | 2.545 | 0.0009 |

For the purposes of this specification and appended claims, unless otherwise indicated, all numbers expressing quantities, percentages or proportions, and other numerical values used in the specification and claims, are to be understood as being modified in all instances by the term “about.” Accordingly, unless indicated to the contrary, the numerical parameters set forth in the following specification and attached claims are approximations that can vary depending upon the desired properties sought to be obtained. It is noted that, as used in this specification and the appended claims, the singular forms “a,” “an,” and “the,” include plural references unless expressly and unequivocally limited to one referent. As used herein, the term “includes” and its grammatical variants are intended to be non-limiting, such that recitation of items in a list is not to the exclusion of other like items that can be substituted or added to the listed items.

As used herein, the term “comprising” means including elements or steps that are identified following that term, but any such elements or steps are not exhaustive, and an embodiment can include other elements or steps. Although the terms “comprising” and “including” have been used herein to describe various aspects, the terms “consisting essentially of” and “consisting of” can be used in place of “comprising” and “including” to provide for more specific aspects of the disclosure and are also disclosed.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A cured polymer composition obtained by curing a curable polymer composition, the curable polymer composition comprising:

(i) a copolymer of a diisoalkenylarene and a divinylarene, wherein the copolymer has:

a mole ratio of diisoalkenylarene to divinylarene of 1:15 to 15:1, a solubility in a hydrocarbon solvent at 25° C. for a period of less than 4 hours of at least 10 wt. %, measured according to Solubility Test as described in the specification, a glass transition temperature (Tg) of 50° C. to 300° C., measured according to ASTM D3418, and a Gel Content of less than 5 wt. %, based on total weight of the copolymer, measured according to Gel Content Test as described in the specification; and (ii) 0.001 to 10 wt. % of an anti-scorching agent selected from the group consisting of styrene, alpha-methyl styrene monomer, alpha-methyl styrene dimer, alpha-methyl styrene oligomer, hindered phenolic compounds, non-hindered phenolic compounds, benzimidazoles, and mixtures thereof, based on total weight of the curable polymer composition;

wherein the curable polymer composition at a concentration of 72.5 wt. % in toluene, after storing at 40° C. for 1 day, has a solution viscosity as measured by Brookfield Viscometer at 25° C. of at least 20% less than the solution viscosity of a polymer composition without the anti-scorching agent; and wherein the cured polymer is characterized as having:

a gel content of greater than 90%, a dielectric constant (Dk) of less than 2.7, measured at 10 GHz according to ASTM D2520, and a dissipation factor (Df) of less than 0.006, measured at 10 GHz according to ASTM D2520.

2. The cured polymer composition of claim 1, wherein the curable polymer composition has a mole ratio of diisoalkenylarene to divinylarene of 10:1 to 1:10.

3. The cured polymer composition of claim 1, wherein the copolymer of the diisoalkenylarene and the divinylarene has a solubility of 10 to 75 wt. % in a hydrocarbon solvent at 25° C. for a period of less than 4 hours.

4. The cured polymer composition of claim 1, wherein the copolymer of the diisoalkenylarene and the divinylarene has a Gel Content of 0.05 to 5 wt. %.

5. The cured polymer composition of claim 1, wherein the copolymer of the diisoalkenylarene and the divinylarene has a glass transition temperature of 100° C. to 250° C.

6. The cured polymer composition of claim 1, wherein the curable polymer composition has a solution viscosity of at least 30% less than a solution viscosity of a polymer composition without the anti-scorching agent.

7. The cured polymer composition of claim 1, wherein the curable polymer composition has a solution viscosity of at least 40% less than a solution viscosity of a polymer composition without the anti-scorching agent.

8. The cured polymer composition of claim 1, wherein the curable polymer composition has a gel point of greater than 125° C., measured on a film of the curable polymer composition dried at 120° C. for 5 minutes.

9. The cured polymer composition of claim 1, wherein the curable polymer composition has a gel point of greater than 130° C., measured on a film of the curable polymer composition dried at 120° C. for 5 minutes.

10. The cured polymer composition of claim 1, wherein the curable polymer composition has a gel point of greater than 140° C., measured on a film of the curable polymer composition dried at 35° C. for 5 minutes.

11. The cured polymer composition of claim 1, wherein the curable polymer composition has a gel point at least 10% higher than a gel point of a polymer composition without the anti-scorching agent, measured on a film of the curable polymer composition dried at 120° C. for 5 minutes.

12. The cured polymer composition of claim 1, wherein the diisoalkenylarene is selected from the group consisting of 1,3-diisopropenylbenzene, 1,2-diisopropenylbenzene, 1,4-diisopropenylbenzene, 3,4-dicyclohexyl-1,2-diisopropenyl-benzene, 5-(3-methyl-cyclopentyl)-1,3-diisopropenylbenzene, 3-cyclopentyl-methyl-6-n-propyl-1,4-diisopropenylbenzene, 4-(2-cyclo-butyl-1-ethyl)-1,2-diisopropenylbenzene, 3-(2-n-propylcyclopropyl)-1,4-diisopropenylbenzene, 2-methyl-5-n-hexyl-1,3-diisopropenylbenzene, 4-methyl-1,2-diisopropenylbenzene, 5-ethyl-1,3-diisopropenylbenzene, 3-methyl-1,4-diisopropenylbenzene, and mixture thereof.

13. The cured polymer composition of claim 1, wherein the divinylarene is selected from the group consisting of divinylbenzene, divinylnaphthalene, divinylbiphenyl, divinyldiphenylether, and mixtures thereof.

14. The cured polymer composition of claim 1, wherein the copolymer of the diisoalkenylarene and the divinylarene has a number average molecular weight (Mn) of 1 to 10 kg/mol, a weight average molecular weight (Mw) of 3 to 70 kg/mol, and a polydispersity index of 2 to 20.

15. The cured polymer composition of claim 1, wherein the curable polymer composition comprises 0.010 to 5 wt. % of the anti-scorching agent, based on total weight of the curable polymer composition.

16. The cured polymer composition of claim 1 is obtained by curing the curable polymer composition at a temperature of greater than 140° C.

17. The cured polymer composition of claim 1, wherein the curable polymer composition is cured at a temperature at least 30° C. higher than a curing temperature of a polymer composition without the anti-scorching agent.

18. The cured polymer composition of claim 1, wherein the cured polymer composition has a Swelling Content of less than 30%.

19. The cured polymer composition of claim 1, wherein the cured polymer composition has a Gel Content of greater than 95%, measured according to Gel Content Test as described in the specification.

20. The cured polymer composition of claim 1, wherein the cured polymer composition has a dielectric constant (Dk) of <2.6, and a dissipation Factor (Df) of <0.005, both are measured at 10 GHz, according to ASTM D2520.

* * * * *